United States Patent
Zawacki et al.

(10) Patent No.: US 8,189,922 B2
(45) Date of Patent: May 29, 2012

(54) TECHNIQUES FOR ADJUSTING A DRYING TIME OF DIGITAL INK

(75) Inventors: Jennifer Greenwood Zawacki, Hillsborough, NC (US); Just Tyler Dubs, Durham, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 716 days.

(21) Appl. No.: 12/238,117

(22) Filed: Sep. 25, 2008

(65) Prior Publication Data

US 2010/0073409 A1 Mar. 25, 2010

(51) Int. Cl.
*G06K 9/00* (2006.01)
(52) U.S. Cl. .................. 382/188; 382/315
(58) Field of Classification Search .......... None
See application file for complete search history.

(56) References Cited

U.S. PATENT DOCUMENTS

| | | | | |
|---|---|---|---|---|
| 5,083,377 A * | 1/1992 | Matsushima | ...... | 33/18.1 |
| 5,320,670 A * | 6/1994 | Foster et al. | ...... | 106/251 |
| 5,646,650 A * | 7/1997 | Miller et al. | ...... | 345/179 |
| 6,801,211 B2 * | 10/2004 | Forsline et al. | ...... | 345/581 |
| 7,174,042 B1 * | 2/2007 | Simmons et al. | ...... | 382/187 |
| 7,259,752 B1 * | 8/2007 | Simmons | ...... | 345/173 |
| 7,613,842 B2 * | 11/2009 | Kong | ...... | 710/8 |
| 2006/0082579 A1 * | 4/2006 | Yao | ...... | 345/473 |

* cited by examiner

*Primary Examiner* — Brian P Werner
(74) *Attorney, Agent, or Firm* — Antony P. Ng; Yudell Isidore Ng Russell PLLC

(57) ABSTRACT

A technique that facilitates modifying (e.g., erasing or smudging) digital ink includes selecting a digital ink drying time based on a selected digital ink type. An ink stroke associated with the selected digital ink type is then tracked. The ink stroke may then be modified, prior to an end of the digital ink drying time, without using a dedicated tool.

6 Claims, 2 Drawing Sheets

TECHNIQUES FOR ADJUSTING A DRYING TIME OF DIGITAL INK

BACKGROUND

1. Field

This disclosure relates generally to digital ink and, more specifically to techniques for adjusting a drying time of digital ink.

2. Related Art

Digital ink refers to technology that facilitates digital representation of handwriting, drawing, sketching, and painting (among other inputs) in their natural form. In a typical digital ink system, a digitizer is laid under (or over) a display screen, e.g., a liquid crystal display (LCD), to capture movement of a special-purpose pen (or stylus) and record the movement on the screen. Visually, moving a stylus across a screen is similar to writing or drawing on paper with liquid ink. When the movement corresponds to handwriting, the recorded handwriting can then be saved as digitized handwriting or converted to typewritten text using handwriting recognition technology.

Digital ink also allows users to, for example, create a sketch, a painting, or a drawing, take free-hand notes, and annotate existing documents (e.g., visual presentation documents, spreadsheet documents, and text documents). In many applications, using a pen to input information into a tablet personal computer (PC) is quicker and easier than using a keyboard or mouse. For example, free-form notes created with digital ink may be readily emailed to other individuals for review. Motion of a pen across a surface of a screen is reflected on the screen as a series of data points. As the pen is moved across the screen, information from the pen movement is collected in a process known as sampling and save in a memory.

A typical tablet PC is capable of sampling about one-hundred thirty pen events (units of motion that correspond to data points) per second. The pen events are then represented visually on the screen as pen strokes. Employing a relatively high sampling rate allows digital ink to be displayed and stored with relatively high graphical resolution, which is desirable for visual legibility on a screen and for maximizing accuracy during a handwriting recognition process. In handwriting recognition applications, a greater number of collected data points usually equates to greater accuracy when the collected data points (are passed through a recognizer and) associated with words. Digital ink systems may be incorporated within a wide variety of devices, e.g., tablet PCs, personal digital assistants (PDAs), smart phones, etc. Tablet PCs are often used where normal notebook computer systems (notebooks) are impractical, unwieldy, or do not provide a needed functionality. Today, digital ink (of conventional digital ink systems) is permanent unless an erase command is employed to erase the digital ink and a specific tool is required to smudge digital ink.

SUMMARY

According to one or more embodiments of the present invention, a technique that facilitates modifying (e.g., erasing or smudging) digital ink includes selecting a digital ink drying time based on a selected digital ink type. An ink stroke associated with the selected digital ink type is then tracked. The ink stroke may then be modified (prior to an end of the digital ink drying time) without using a dedicated tool.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
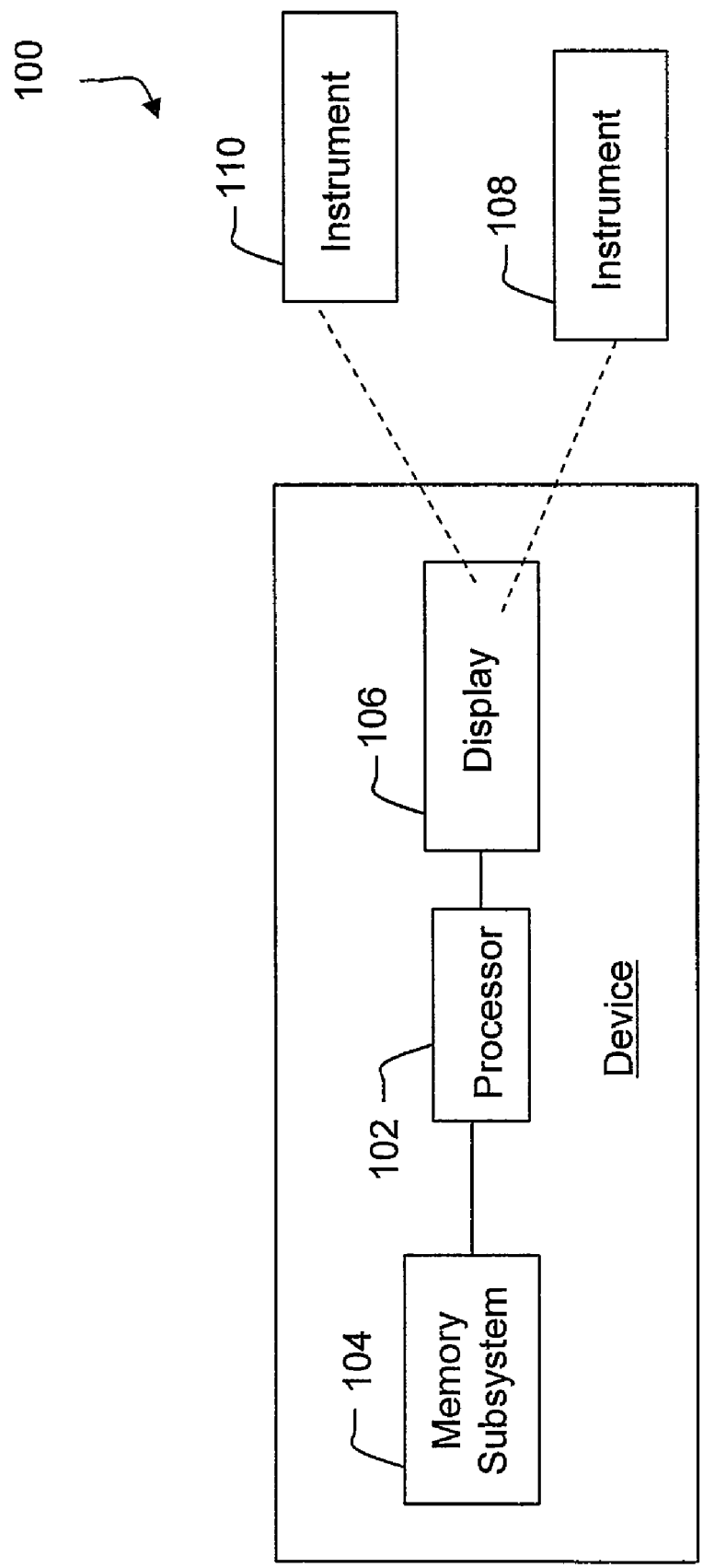
FIG. 1 is a block diagram of a relevant portion of an example device that is configured to modify an ink stroke (prior to an end of an associated digital ink drying time) without using a dedicated tool, according to one or more embodiments of the present disclosure.

As will be appreciated by one of ordinary skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product on a computer-readable storage medium having computer-readable program code embodied in the medium.

Any suitable computer-usable or computer-readable storage medium may be utilized. The computer-usable or computer-readable storage medium may be, for example, but is not limited to, an electronic, magnetic, optical, electromagnetic, infrared, or semiconductor system, apparatus, or device. More specific examples (a non-exhaustive list) of the computer-readable storage medium includes the following: a portable computer diskette, a hard disk, a random access memory (RAM), a read-only memory (ROM), an erasable programmable read-only memory (EPROM) or flash memory, a portable compact disc read-only memory (CD-ROM), an optical storage device, or a magnetic storage device. It should be noted that the computer-usable or computer-readable storage medium can even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable storage medium may be any medium that can contain or store a program for use by or in connection with an instruction execution system, apparatus, or device.

Computer program code for carrying out operations of the present invention may be written in an object oriented programming language, such as Java, Smalltalk, C++, etc. However, the computer program code for carrying out operations of the present invention may also be written in conventional procedural programming languages, such as the "C" programming language or similar programming languages. The program code may execute entirely on a single processor, on multiple processors that may be remote from each other, or as a stand-alone software package. When multiple processors are employed, one processor may be connected to another processor through a local area network (LAN) or a wide area network (WAN), or the connection may be, for example, through the Internet using an Internet service provider (ISP).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. As used herein, the term "coupled" includes both a direct electrical connection between blocks or components and an indirect electrical connection between blocks or components achieved using intervening blocks or components.

According to various aspects of the present disclosure, techniques are employed that facilitate modifying (e.g., erasing or smudging) digital ink based upon a digital ink drying time (i.e., a time in which the digital ink has been in place). Implementing a drying time for digital ink is particularly advantageous in painting applications where the ability to manipulate wet digital ink for a period of time may improve an overall painting experience (as various regular inks, paints, etc., typically have varying drying times).

With reference to FIG. 1, an example device 100 is illustrated that includes a display 106 that is configured to receive input from a user via instruments 108 and 110. The display 106 may correspond to, for example, a touchscreen or a liquid crystal display (LCD) with an associated digitizer. The instrument 108 may correspond to, for example, an active stylus. In at least one embodiment, one end of an active stylus may be utilized by a user to write digital ink and an opposite end of the active stylus may be utilized by the user to erase digital ink.

The instrument 110 may correspond to, for example, an eraser of a pencil or a finger of a user. According to one or more aspects of the present disclosure, a finger of a user (or other object) may utilized to modify (e.g., smudge or erase) digital ink prior to the digital ink drying. According to this embodiment, after the digital ink has dried, the digital ink may only be modified through the use of a tool (e.g., an active stylus). A digital ink may correspond to a paint (e.g., an oil-based paint or a water-based paint), a pencil lead, or a pen. According to this embodiment, a user may select a different type of digital ink to work with.

In a typical application, a pencil lead never dries (i.e., digital ink associated with a pencil lead can be erased at any time) and a pen (i.e., digital ink associated with a pen) dries in a relatively short period of time (e.g., fifteen minutes). As another example, a water-based paint (i.e., digital ink associated with water-based paint) may dry in thirty minutes and an oil-based paint (i.e., digital ink associated with an oil-based paint) may dry in a couple of hours. In at least one embodiment, a user defined digital ink may have a user defined drying time. In a typical implementation, digital ink is configured to be more difficult to modify (i.e., more pressure is required) as the digital ink dries.

As is shown, the display 106 is coupled to a processor 102 (that includes one or more central processing units (CPUs)), which is coupled to a memory subsystem 104 (which includes an application appropriate amount of volatile and non-volatile memory). In various embodiments, the memory subsystem 104 is configured to store ink strokes. The device 100 may also include, for example, a video card, a hard disk drive (HDD), a network interface card (NIC), a compact disk read-only memory (CD-ROM) drive, among other components not shown in FIG. 1. The device 100 may be, for example, a tablet PC, a personal digital assistant (PDA), a smart phone, or virtually any other device.

Figure 2:
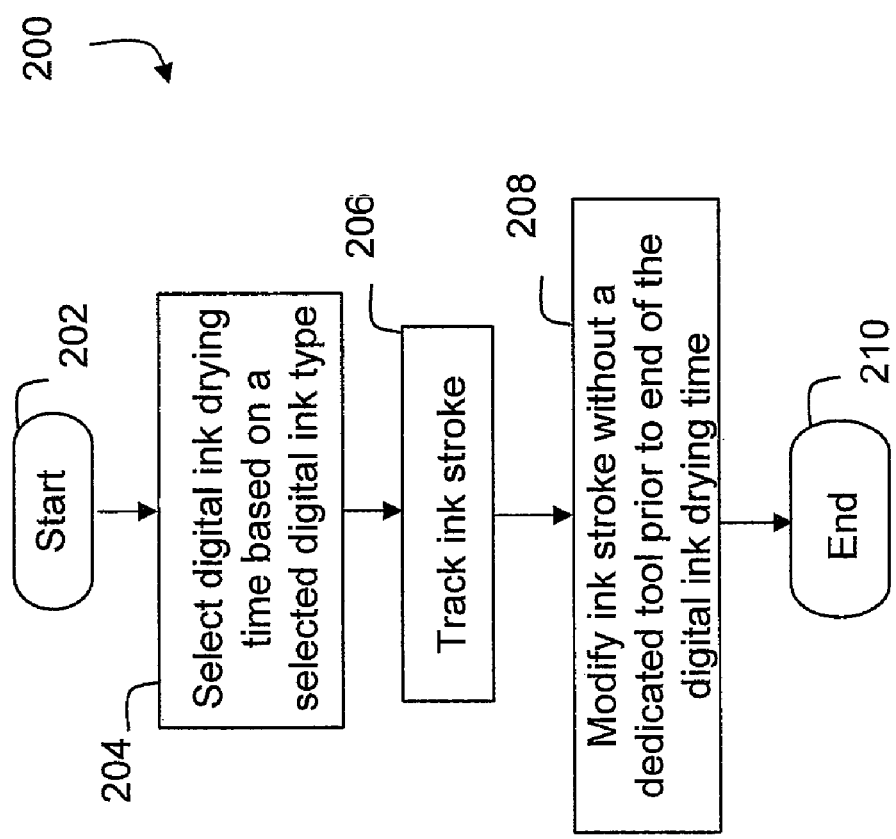
FIG. 2 is a flowchart of an example process for modifying an ink stroke (prior to an end of an associated digital ink drying time) without using a dedicated tool, according to one or more embodiments of the present disclosure.

Moving to FIG. 2, an example process 200 for adjusting a drying time of digital ink displayed on a screen (e.g., the display 106 of FIG. 1) is illustrated. In block 202, the process 200 is initiated at which point control transfers to block 204, where a processor selects a digital ink drying time based on a selected digital ink type. It should be appreciated that the selected digital ink type may be user selected or correspond to a default digital ink type. The processor may correspond to a general purpose processor (e.g., the processor 102 of the device 100) or a graphics processor that may be located on a video card or integrated on a mother board with the processor 102. Next, in block 206, the processor tracks an ink stroke associated with the selected digital ink type. Then, in block 208, the ink stroke is modified (e.g., smudged or erased) prior to an end of the digital ink drying time by a user (e.g., using a finger of the user). As noted above, subsequent to the end of the digital ink drying time, the digital ink typically requires a dedicated tool to modify. Following block 208, control transfers to block 210 where the process 200 terminates.

Accordingly, techniques have been described herein that facilitate modifying (e.g., erasing or smudging) digital ink based upon a digital ink drying time.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. For example, the present techniques can be implemented in any kind of system that includes a hard disk drive. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. An apparatus, comprising:
    a stylus;
    a touchscreen display capable of receiving a first input from a user via said stylus, and in turn displaying said first input, wherein said touchscreen display is also capable of receiving a second input from said user for modifying said first input via a non-electrical tool, and in turn displaying a result of said modification;
    a memory for storing a plurality of digital ink types, each of said digital ink types is associated with a specific drying time; and
    a processor coupled to said memory and said touchscreen display, wherein said processor is configured to:
        track strokes of said first input using one of said digital ink types selected by said user; and
        modify said strokes of said first input according to said second input from said user if and when said second input is received before a drying time of said selected digital ink type has been reached.

2. The apparatus of claim 1, wherein said non-electrical tool is a finger of said user.

3. The apparatus of claim 1, wherein said apparatus is a tablet computer.

4. The apparatus of claim 1, wherein said apparatus is a personal digital assistant.

5. The apparatus of claim 1, wherein said apparatus is a mobile phone.

6. A method, comprising:
    providing a touchscreen for receiving a first input from a user via a stylus;
    tracking strokes of said first input using one of a plurality of digital ink types selected by said user, wherein said plurality of digital ink types are stored in a memory coupled to said touchscreen, each of said digital ink types is associated with a specific drying time;
    displaying said strokes of said first input;
    in response to a receipt of a second input from said user for modifying said first input via a finger of said user, modifying said strokes of said first input according to said second input from said user if and when said second input is received before a drying time of said selected digital ink type has been reached; and
    displaying a result of said modification on said touchscreen.

* * * * *